(12) United States Patent
Berthault et al.

(10) Patent No.: US 8,988,659 B2
(45) Date of Patent: Mar. 24, 2015

(54) OPTOELECTRONIC DEVICE FOR OBSERVING AND/OR AIMING AT A SCENE, COMPRISING A RANGEFINDER, AND RELATED RANGE-FINDING METHOD

(75) Inventors: Frederic Berthault, Paris (FR); Philippe Patry, Paris (FR); Thibault Augey, Paris (FR)

(73) Assignee: Sagem Defense Securite, Paris (FR)

( * ) Notice: Subject to any disclaimer, the term of this patent is extended or adjusted under 35 U.S.C. 154(b) by 0 days.

(21) Appl. No.: 13/822,633

(22) PCT Filed: Oct. 6, 2011

(86) PCT No.: PCT/EP2011/067435
§ 371 (c)(1),
(2), (4) Date: Mar. 12, 2013

(87) PCT Pub. No.: WO2012/045802
PCT Pub. Date: Apr. 12, 2012

(65) Prior Publication Data
US 2013/0182238 A1  Jul. 18, 2013

(30) Foreign Application Priority Data
Oct. 6, 2010 (FR) ...................... 10 58106

(51) Int. Cl.
*G01S 17/89* (2006.01)
*G01S 17/02* (2006.01)
*F41G 3/06* (2006.01)
*F41G 3/16* (2006.01)
*G01S 17/10* (2006.01)

(52) U.S. Cl.
CPC .............. *G01S 17/89* (2013.01); *G01S 17/023* (2013.01); *F41G 3/06* (2013.01); *F41G 3/165* (2013.01); *G01S 17/10* (2013.01)
USPC ..................................... 356/4.01

(58) Field of Classification Search
CPC ......... G01S 17/89; G01S 17/00; G01S 7/481; G01C 3/08; G01C 11/00; G01C 15/002; G01B 11/24
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 6,069,656 A * | 5/2000 | Silver | 348/169 |
| 2005/0099637 A1* | 5/2005 | Kacyra et al. | 356/601 |
| 2006/0201047 A1 | 9/2006 | Lowrey | |

FOREIGN PATENT DOCUMENTS

| | | |
|---|---|---|
| EP | 0638824 | 5/1995 |
| FR | 2921149 | 3/2009 |

*Primary Examiner* — Luke Ratcliffe
(74) *Attorney, Agent, or Firm* — Blakely Sokoloff Taylor & Zafman

(57) ABSTRACT

The invention concerns an opto-electronic device for observing and/or aiming at a scene comprising a target (C), comprising
  an observation module (1) comprising
    an image sensor (10) and
    a stabiliser (11) for a line of sight (100) towards the target (C); and
  a telemeter (2) comprising
    a multi-shot pulsed laser (20) for emitting a plurality of outward laser pulses (An) in the direction of the target (C) to be telemetered, and
    a detector (21) for a plurality of return laser echoes (Rn) reflected by the scene in order to generate an electrical signal for each return laser echo (Rn) in order to effect a measurement of the distance to the target (C), each return laser echo (Rn) corresponding to an outward laser pulse (An);
characterised in that it also comprises
  a sensor (3) of angular movement of the device with respect to the stabilised line of sight (100) in order to determine an angular radius (ρn) of each outward laser pulse (An) with respect to the stabilised line of sight (100); and
  a selector (4) for processing each electrical signal, corresponding to a return laser echo (Rn), according to the angular radius (ρn) of the corresponding outward laser pulse (An).

The invention also concerns a telemetry method implemented on such a device.

10 Claims, 2 Drawing Sheets

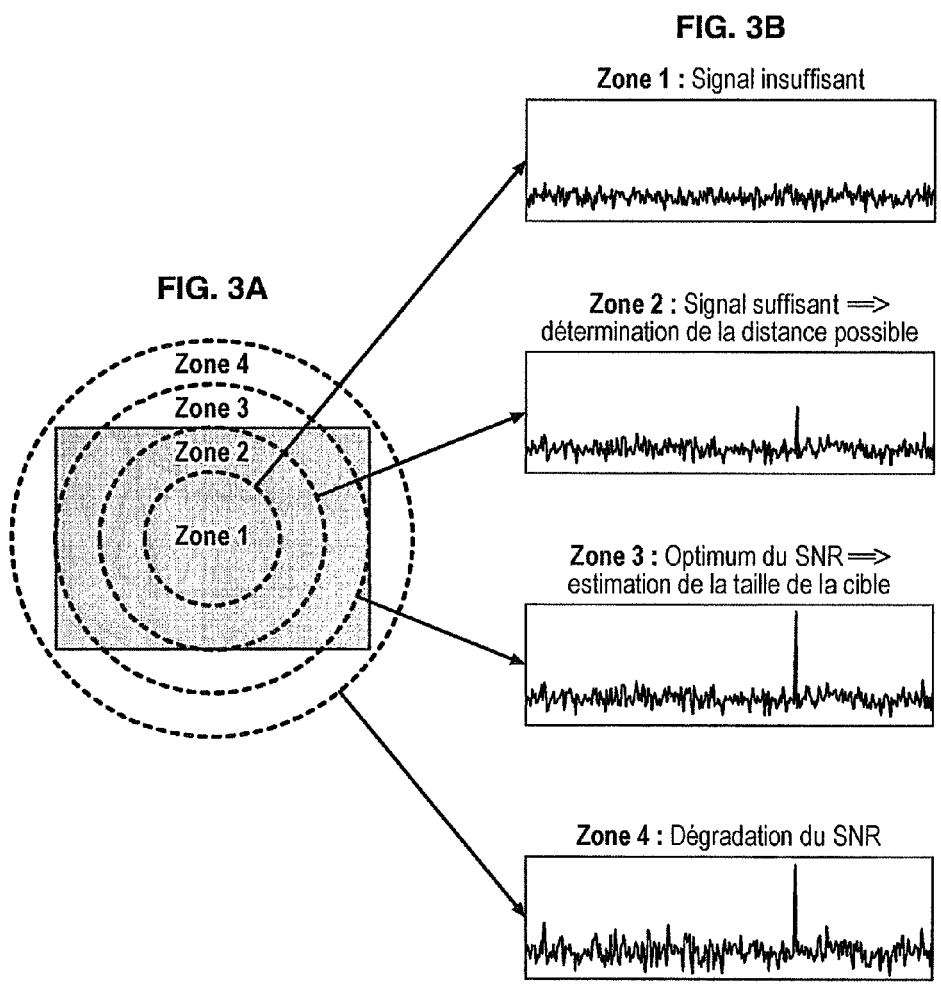

OPTOELECTRONIC DEVICE FOR OBSERVING AND/OR AIMING AT A SCENE, COMPRISING A RANGEFINDER, AND RELATED RANGE-FINDING METHOD

FIELD OF THE INVENTION

The present invention concerns an optoelectronic device for observing and/or aiming at a scene comprising an area of interest referred to as the target in the remainder of the present description, comprising
   an observation module comprising
      an image sensor and
      a stabiliser for a line of sight towards the target; and
   a telemeter comprising
      a multi-shot pulsed laser for emitting a plurality of outward laser pulses in the direction of the target to be telemetered, and
      a detector for a plurality of return laser pulses reflected by the scene in order to generate an electrical signal for each return laser pulse in order to effect a telemetry of the target, each return laser pulse corresponding to an outward laser pulse.

It also concerns a telemetry method implemented on such a device.

PRIOR ART

Aiming and/or observation devices comprising a telemeter are known.

The known devices comprise conventionally:
   an observation channel that comprises an image sensor,
   a laser telemetry channel, also referred to as a laser channel,
   a display screen common to the two channels, on which there appears the image issuing from the image sensor and on which there are positioned an aiming reticle representing the axis of sight of the laser telemeter and a reticle representing the centre of the image sensor. These reticles are generally in the form of a cross but may also take different forms, such as for example a circle, a square, etc.

To telemeter a target, an operator of the device orients it so as to position the laser reticle on the target and then at least one laser firing is effected by action on a push button.

The telemeter sends at least one laser pulse of short duration (typically 20 ns) and simultaneously triggers an electronic chronometer. In the case of single-shot telemeters sending only one laser pulse, the chronometer is stopped when the laser echo returned by the target is detected by a detector of the laser channel.

The travel time of the laser pulse for effecting a round trip to and from the target is thus known and the telemeter derives therefrom the distance to the target, the speed of light being a known constant.

The laser beam of the telemeter is sent in a very narrow sector (typically approximately 1 mrad, or even less), which requires very precise aiming of the laser.

Equipping such a device with an image stabilisation system is therefore known, which compensates for the disturbing movements of the operator holding the device with his hands.

The ideal situation is to stabilise all the optical channels, that is to say both the channel for observing the scene and the laser telemetry channel (comprising the channel emitting the laser pulse and the channel detecting the laser echo after return thereof by the target).

Stabilisation makes it possible to keep the axis of sight of the observation channel constant, despite small movements of the device. As with all hand-held observation and/or aiming devices, disturbing movements correspond in fact to movements of the device of small amplitudes and high time frequencies (whereas intentional movements correspond to movements of high amplitudes and low frequencies).

However, this ideal situation of the stabilisation of the observation channel and the telemetry channel, usually employed for viewfinders installed on vehicles, is difficult to implement on hand-held equipment, such as observation binoculars for example.

In the case of hand-held equipment, it is possible to stabilise the scene observation channel by image processing. This method is unfortunately not applicable to the telemetry channel. Thus, by stabilising the observation channel, a stable image is obtained on the observation channel but the laser axis of this image is moving.

However, it is humanly difficult to aim at the target without moving for long enough to effect the telemetry firing.

A solution known according to FR 2 921 149 consists of delaying the telemetry firing in the event of an excessively great offset between the axis of sight and the laser axis and only trigger the laser firing when the offset is less than a determined threshold. Under these conditions the laser firing reaches the target and a measurement of distance to the target can be made.

The solution known from FR 2 921 149 does however have at least one drawback.

It is well suited to the case of a single-shot pulsed laser firing, that is to say a single firing in the form of a pulse with high laser energy.

There do however exist multi-shot pulse-type telemeters, that is to say with laser firing in the form of a plurality of laser pulses. With this type of laser, the frequency of the pulses is typically from 5 kHz to 10 kHz, and a distance measurement, obtained by global electrical processing of all the signals generated by the detector for each of the echoes corresponding to each of the pulses sent, is in general obtained after typically one second (the distance to the target being considered to be constant during the telemetry period).

Each laser pulse reflected generates in fact a laser echo, which itself generates a signal on a detector of the telemeter, sampled and stored. During the laser firing sequence, all the signals are added. The signal corresponding to the target is added arithmetically (since the target is at a constant distance during the telemetry, the electrical signal corresponding to the echo due to the target is always sampled at the same moment and with an amplitude of the same sign), while the other signals, formed after rejection of the continuous component by the random electrical noise inherent in the detector, are added quadratically. The multi-shot functioning therefore increases the signal to noise ratio (SNR) proportionally to $\sqrt{N}$, N being the number of pulses.

Multi-shot pulse type telemeters are in general more stealthy (that is to say less easily detectable by an enemy optical sensor for example), since
   each laser pulse has a much lower energy than the single pulse of the single-shot laser, and since
   multi-shot firing can be stopped as soon as a satisfactory measurement of distance to the target is obtained, for example after a few hundreds of pulses (for example after 100 ms).

The solution known from FR 2 921 149, applied this time to a multi-shot telemeter, may perhaps guarantee that the first pulse (or even a few tens of pulses) will be properly directed to the target. However, even for a telemetry lasting only 100 ms, the directions of the following pulses (especially in the case of telemetry lasting approximately an entire second) cannot be controlled, since the disturbing movements of the operator are in general between a few hertz and 10 hertz.

However, when the angular size of the target that the operator wishes to telemeter becomes comparable or smaller than the amplitude of the disturbing movements of the line of sight, a significant number of the laser pulses may be reflected not by the target but by other objects situated on either side thereof, and at other distances. Because of this, the signal to noise ratio of the measurement, associated with the travel time to the target, significantly decreases, and may go as far as making the distance measurement impossible.

In addition, secondary echoes may appear, leaving the user the often difficult task of deciding on the distance that must be adopted as being the correct one among several echoes presented.

It may also happen that the laser pulses are not at all reflected, and lost for the telemetry.

PRESENTATION OF THE INVENTION

The invention proposes to overcome at least one of these drawbacks.

To this end, an opto-electronic device for observing and/or aiming at a scene comprising a target is proposed according to the invention, comprising
    an observation module comprising
        an image sensor and
        a stabiliser for a line of sight towards the target; and
    a telemeter comprising
        a multi-shot pulsed laser for emitting a plurality of outward laser pulses in the direction of the target to be telemetered, and
        a detector for a plurality of return laser echoes reflected by the scene in order to generate an electrical signal for each return laser echo in order to effect a measurement of distance to the target, each return laser echo corresponding to an outward laser pulse;
    characterised in that it also comprises
    a sensor of angular movement of the device with respect to the stabilised line of sight in order to determine an angular radius of each outward laser pulse with respect to the stabilised line of sight; and
    a selector for processing each electrical signal, corresponding to a return laser echo, according to the angular radius of the corresponding outward laser pulse.

The invention is advantageously supplemented by the following features, taken alone or in any one of the technically possible combinations thereof:
- the selector is adapted so as to take into account only the electrical signals corresponding to the return laser echoes Rn the outward laser pulses An of which satisfy the following condition:

$$\rho n \leq \rho 0 \quad (I1)$$

Where $\rho n$ is the angular radius of the $n^{th}$ outward laser pulse An; and
$\rho 0$ is a characteristic angular radius;
- the selector is adapted for
    making a plurality of analyses of a telemetry of the target, taking into account only the electrical signals where the outward laser pulse An satisfies the condition (I1), for a plurality of different $\rho 0$s, and
    determining a $\rho 0_{optimum}$ for optimising a signal to noise ratio of the echo of the target in the global echo signal;
- the selector is adapted for
    storing at least one zone of interest around the target C, by default; and/or
    accepting a manual parameterising of a zone of interest by an operator of the device; and/or
    automatically determining a zone of interest around the target C;
- the selector is adapted to effect a mapping of the scene in a mapping zone by making a plurality of analyses of a plurality in the mapping zone;
- the selector is adapted to allocate a weighting coefficient to each electrical signal corresponding to a return laser echo;
- the selector is adapted to process the electrical signals in real time or during post-processing;
- the angular movement sensor comprises:
    at least one gyrometer; and/or
    at least one differential accelerometer; and/or
    at least one module for processing images issuing from the image sensor (10); and
- the device forms portable binoculars or a portable telescopic sight.

The invention also concerns a telemetry method implemented on such a device.

The invention has numerous advantages.

It preserves the stealth of the multi-shot telemetry.

It improves the final signal to noise ratio and prevents false echoes.

It also makes it possible to generate additional data on the dimensions and shape of the target and on the immediate surroundings thereof.

PRESENTATION OF THE FIGURES

Other features, aims and advantages of the invention will emerge from the following description, which is purely illustrative and non-limitative, and which must be read with regard to the accompanying drawings, on which:

FIG. 3 show schematically a particular implementation of the invention in which the characteristic angular radius is determined automatically by the device.

In all the figures, similar elements bear identical numerical references.

DETAILED DESCRIPTION

Figure 1:
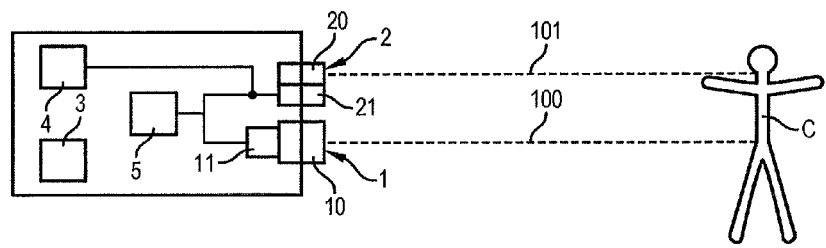
FIG. 1 shows schematically a possible device according to the invention.

FIG. 1 shows schematically a possible embodiment of an optoelectronic device for observing and/or aiming at a scene comprising a target C.

The device conventionally comprises an observation module 1 and a telemeter 2.

The module 1 comprises an image sensor 10 and a stabiliser 11 for a line of sight 100 towards the target C.

The target C may be of any type, such as for example an individual or a vehicle, for example an aircraft or a battle tank.

The telemeter 2 conventionally comprises a multi-shot pulsed laser 20 for emitting a plurality of outward laser pulses An on a laser aiming line 101, in the direction of the target C to be telemetered, and a detector 21 for the return laser echoes Rn reflected by the scene, and according to the travel time to the target. Each return laser echo Rn therefore corresponds to an outward laser pulse An.

To determine the direction of the stabilised line of sight 100, the observation module 1 may for example be adapted to effect an averaging of the disturbing movements of an operator of the device, and corresponding to the aiming noise.

Since the laser line of sight 101 is not stabilised, it includes the disturbing movements of the operator of the device.

The disturbing movements can thus be estimated differentially between the stabilised line of sight 100 and the laser line of sight 101.

The direction of the stabilised line of sight 100 can also be estimated by applying any numerical filter to the last information concerning the line of sight 100. A low-pass filter, with a well chosen cutoff frequency (for example a few hertz), can in particular be adapted to enable the user to telemeter a fixed or moving target since the change in the line of sight 100 related to involuntary disturbing movements is dispensed with whereas the intentional movement performed consciously by the operator to follow a moving target C must be taken into account in the algorithm for determining the direction of the target.

Other methods are also possible for determining the direction of the stabilised line of sight 100, using for example an angular movement sensor described in more detail later in the present description.

The pulses An typically have a duration of 20 ns for an energy of 0.5 µJ per pulse and a peak power of 25 W, and the frequency of the pulse is typically between 1 kHz and 10 kHz, for example 5 kHz.

The detector 21 is adapted to generate an electrical signal for each return laser echo Rn and to effect a telemetry of the target C. To this end, the detector 21 comprises for example a photodiode.

The device conventionally comprises a display screen 5 common to the two channels, on which the image issuing from the image sensor appears and on which there are positioned an aiming reticle representing the axis of sight of the laser telemeter and a reticle representing the centre of the image sensor. These reticles are generally in the form of a cross, but may also take different forms, such as for example a circle, a square, etc.

The device also comprises a sensor 3 of the angular movement of the device with respect to the stabilised line of sight 100.

The sensor 3 is able to determine an angular radius ρn of each outward laser pulse An with respect to the stabilised line of sight 100.

Figure 2A:
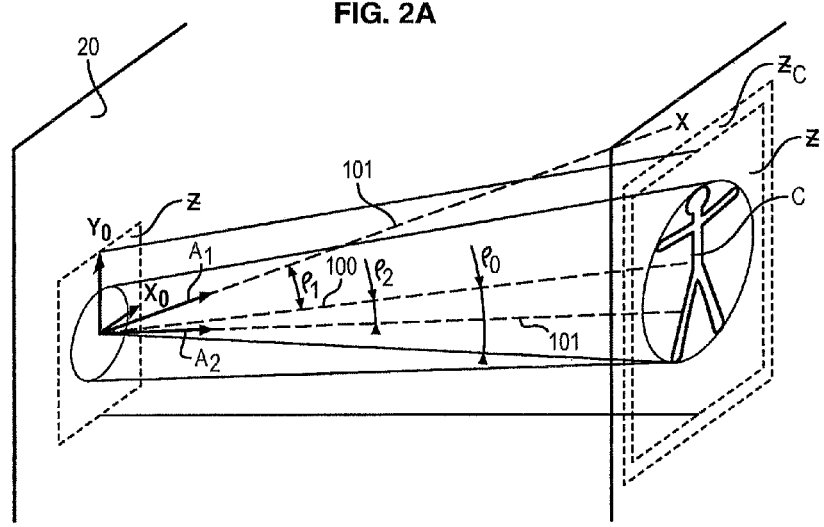
FIG. 2 show schematically outward laser pulses emitted by a device according to the invention, and corresponding angular rays.
Figure 2B:
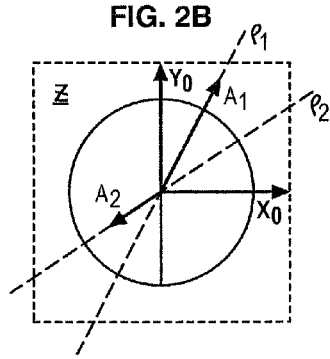

As shown in FIG. 2, the angular radius ρn is defined as the angle between the axis of the stabilised line of sight 100 and the axis of the actual laser line of sight 101 for the pulse An, in the plane Pn. FIG. 2 thus show ρ1 in the plane P1 for the pulse A1 and ρ2 in the plane P2 for the pulse A2.

As shown by FIG. 2, the angular radius ρn of each pulse An is generated by the disturbing movements of the operator, which may give rise to a pulse An not reaching the target C. Thus the pulse A1 does not reach the target C while the pulse A2 does reach it.

The sensor 3 thus comprises for example:
at least one gyrometer, and/or
at least one differential accelerometer; and/or
at least one module for processing images issuing from the image sensor 10.

It will be understood that, in the case of a gyrometer or accelerometer, it is the physical movements of the device that are analysed, while in the case of an image processing module it is the offsets between the successive images of the sensor 10 that are calculated.

The device also comprises a selector 4 able to process each electrical signal, corresponding to a return laser echo Rn, and generated by the detector 21, according to the angular radius ρn of the outward laser pulse An corresponding to the return echo Rn.

The device thus uses the radius ρn of each pulse An for deciding on the processing to be carried out on the electrical signal issuing from the detector 21 for the corresponding pulse Rn, and in particular the taking into account or not of the signal in the telemetry.

Thus let
Tn be the starting time of the $n^{th}$ pulse An, from the telemeter 2;
ρn be the starting angular radius of the $n^{th}$ pulse An at time Tn, which corresponds to the difference of the $n^{th}$ pulse An with respect to the stabilised line of sight 100; and
ρ0 be a characteristic angular radius forming a threshold, the threshold corresponding to the target.

ρ0 is a function in particular of the divergence of the laser pulses, the disturbing movements, the range of the source 20 and the type of target C. It will be understood in particular that, if the target C is large and at a short distance, ρ0 will be greater than for a small target at a very great distance.

First Embodiment

According to a first embodiment, the selector 4 is adapted to take into account the electrical signal corresponding to the echo Rn only if the following condition is satisfied:

$$\rho n \leq \rho 0 \tag{I1}$$

It is considered indeed that the pulses An satisfying this condition reach the target C.

On the other hand, it is considered that the pulses An the angular radius of which satisfies:

$$\rho n > \rho 0$$

do not reach the target.

Not taking into account the electrical signal corresponding to the echo Rn the pulse An of which does not reach the target makes it possible to
avoid generating secondary echoes (by objects downstream or upstream of the plane of the target C) and
improve the signal to noise ratio for a given number of pulses An.

It can in fact be shown that if, over a totality M of pulses An, m pulses are included in the radius ρ0, that is to say touching the target, then the gain G on the signal to noise ratio of the telemetry, taking into account in the telemetry only the m useful echoes that touch the target, is of the form:

$$G \propto \sqrt{\frac{M}{m}}$$

It is therefore advantageous to take into account only the echoes that touch the target, even if m is small with respect to M.

The selector 4 can thus be adapted to store a characteristic angular radius ρ0 by default.

The selector 4 may also, in addition or as an alternative, accept a manual parameterising of a characteristic angular radius ρ0 by an operator of the device.

The selector 4 may also, in addition or as an alternative:
carry out a plurality of analyses of the same telemetry of the target C (a telemetry corresponding to a series of pulses An) taking into account only the electrical signals satisfying the condition (I1), for a plurality of different ρ0s (each analysis of the same telemetry being carried out with a given ρ0), typically increasing, and determine a ρ0$_{optimum}$ for optimising a signal to noise ratio due to the scene.

This is because, as shown by FIG. 3, with a ρ0 corresponding to a zone 1, the signal corresponding to the Rns does not stand out sufficiently from the noise to be able to carry out telemetry. This is because, few Rns are taken into account, and it will be recalled that, in a multi-shot telemetry, the laser pulses are of low energy. The telemetry calculation does not succeed for this value of ρ0.

For a ρ0 corresponding to a zone 2, the signal corresponding to the Rns stands out sufficiently from the noise to be able to carry out telemetry. The first peak of the signal emerging from the noise is considered to be the signal corresponding to the echoes due to the target, at the centre of the line of sight 100. Telemetry is possible.

However, if ρ0 is increased further in order to result in a zone 3, a maximum of the signal to noise ratio is obtained since the telemetry takes into account a large number of Rns.

If ρ0 is increased further, then the signal to noise ratio degrades and/or reveals secondary echoes since the telemetry takes into account the Rns that have not undergone reflection and/or have undergone reflections issuing from objects surrounding the target (rather than issuing from the target).

ρ0$_{optimum}$ is therefore the ρ0 corresponding to the zone 3. ρ0$_{optimum}$ thus gives an estimation of the dimension and form (in angles and in metres) of the various objects situated in the telemetry zone.

Second Embodiment

According to a second embodiment, the selector 4 is adapted so that the operator can define at least one zone of interest Z around the target C. The zone Z can also be defined by default.

The zone Z may for example be defined by at least one of the following parameters:

characteristic coordinates (X0, Y0) that represent the dimensions of the zone Z on a horizontal axis X and a vertical axis Z in the plane of the laser 20;

a zone chosen in space.

The selector 4 can also automatically determine at least one zone of interest.

To this end, the selector 4 forms a post processing of the signals issuing from the detector 21.

For this purpose, with each signal corresponding to an echo Rn, the selector 4 associates coordinates of separation of the pulse An with respect to the line of sight 100. The selector 4 can thus process all the signals in order to identify at least one zone in the space allowing optimisation of the signal to noise ratio corresponding to a distance to the target C.

The selector 4 can of course store or accept several zones of interest Z.

In the first embodiment and in the second embodiment, the selector 4 is therefore adapted to perform a mapping of the scene in a mapping zone Zc corresponding:

either to a ρ0$_{optimum}$ or to a zone of interest Z optimising the signal to noise ratio, by making a plurality of analyses of the same telemetry in the mapping zone Zc. Thus it may be possible to extract from the analyses several distances, sizes and forms of several objects situated in the vicinity of the target aimed at.

Third Embodiment

According to a third embodiment, the selector 4 is adapted to allocate a weighting coefficient to each electrical signal corresponding to an $n^{th}$ laser return echo Rn. This weighting function may for example be a Gaussian function of ρn (that is to say the angular difference between the stabilised line of sight 100 and the laser line of sight 101 at the moment of sending of the outward pulse An).

In all the embodiments described above, the selector 4 is adapted to process the electrical signals either in real time or during post-processing.

The device described above advantageously forms portable binoculars or a portable telescopic sight.

The invention claimed is:

1. Opto-electronic device for observing and/or aiming at a scene comprising a target (C), comprising:
    an observation module (1) comprising
    an image sensor (10) and
    a stabiliser (11) for a line of sight (100) towards the target (C); and
    a telemeter (2) comprising
    a multi-shot pulsed laser (20) for emitting a plurality of outward laser pulses (An) in the direction of the target (C) to be telemetered, and
    a detector (21) for a plurality of return laser echoes (Rn) reflected by the scene in order to generate an electrical signal for each return laser echo (Rn) in order to effect a measurement of distance to the target (C), each return laser echo (Rn) corresponding to an outward laser pulse (An);
    said opto-electronic device further comprising:
    a sensor (3) of angular movement of the device with respect to the stabilised line of sight (100) in order to determine an angular radius (ρn) of each outward laser pulse (An) with respect to the stabilised line of sight (100); and
    a selector (4) for processing each electrical signal, corresponding to a return laser echo (Rn), according to the angular radius (ρn) of the corresponding outward laser pulse (An).

2. Device according to claim 1, in which the selector (4) is adapted so as to take into account only the electrical signals corresponding to the return laser echoes Rn the outward laser pulses An of which satisfy the following condition:

$$\rho n \leq \rho 0 \qquad (I1)$$

where ρn is the angular radius of the $n^{th}$ outward laser pulse An; and

ρ0 is a characteristic angular radius.

3. Device according to claim 2, in which the selector (4) is adapted for
    making a plurality of analyses of a telemetry of the target (C), taking into account only the electrical signals where the outward laser pulse An satisfies the condition (I1), for a plurality of different ρs, and
    determining a ρ0$_{optimum}$ for optimising a signal to noise ratio of the echo of the target in the global echo signal.

4. Device according to claim 2, in which the selector (4) is adapted to
    store at least one zone of interest (Z) around the target (C), by default; and/or
    accept a manual parameterising of a zone (Z) of interest by an operator of the device; and/or
    automatically determine a zone (Z) of interest around the target (C).

5. Device according to claim 3 or claim 4, in which the selector (4) is adapted to effect a mapping of the scene in a mapping zone (Zc) by making a plurality of analyses of a telemetry in the mapping zone (Zc).

6. Device according to claim 1, in which the selector is adaptor to allocate a weighting coefficient to each electrical signal corresponding to a return laser echo (Rn).

7. Device according to claim 1, in which the selector (4) is adapted to process the electrical signals in real time or during post-processing.

8. Device according to claims 1, in which the angular movement sensor (3) comprises:
- at least one gyrometer; and/or
- at least one differential accelerometer; and/or
- at least one module for processing images issuing from the image sensor (10).

9. Device according to claim 1, forming portable binoculars or a portable telescopic sight.

10. Method for the telemetry of a target (C) present in a scene, wherein it is implemented on a device according to claim 1.

* * * * *